(12) United States Patent
Guan

(10) Patent No.: US 7,286,175 B1
(45) Date of Patent: Oct. 23, 2007

(54) BIAS CONTROL CIRCUITRY FOR CATHODE RAY TUBE BEAM CURRENTS

(75) Inventor: Charles Guan, San Francisco, CA (US)

(73) Assignee: National Semiconductor Corporation, Santa Clara, CA (US)

( * ) Notice: Subject to any disclaimer, the term of this patent is extended or adjusted under 35 U.S.C. 154(b) by 210 days.

(21) Appl. No.: 11/160,380

(22) Filed: Jun. 21, 2005

(51) Int. Cl.
*H01J 23/16* (2006.01)

(52) U.S. Cl. .................. 348/327; 348/379; 348/380; 315/383

(58) Field of Classification Search .............. 315/3, 315/381, 383, 379; 348/671, 674, 645, 327, 348/379, 380
See application file for complete search history.

(56) References Cited

U.S. PATENT DOCUMENTS

| 5,657,098 A * | 8/1997 | Ando et al. ............. 348/645 |
| 6,208,094 B1 * | 3/2001 | Morrish ................. 315/383 |
| 6,771,023 B1 | 8/2004 | Guan et al. ............... 315/3 |

* cited by examiner

*Primary Examiner*—David H. Vu
(74) *Attorney, Agent, or Firm*—Vedder, Price, Kaufman & Kammholz, P.C.

(57) ABSTRACT

Bias control circuitry and method for use in controlling one or more cathode ray tube (CRT) beam currents.

15 Claims, 2 Drawing Sheets

… …

BIAS CONTROL CIRCUITRY FOR CATHODE RAY TUBE BEAM CURRENTS

BACKGROUND OF THE INVENTION

The present invention relates to control circuitry for cathode ray Tube (CRT) displays, and in particular, to bias control circuitry for controlling CRT beam currents.

As is well known, a conventional CRT produces images on a display screen coated with phosphors by focusing beams of electrons onto the screen and making the phosphors emit visible light. The electron beams are typically formed by causing a cathode inside the evacuated CRT to emit electrons by applying different voltages between the cathodes (e.g., one for each of the primary colors red, green and blue) and control grids. One or more anodes in the CRT attract, focus and accelerate the electrons. Hence, the anodes may be used to collimate the electrons into tight beams hitting appropriate spots of the display screen. Additionally, coils located outside the CRT are driven with currents to create magnetic fields within the CRT to direct the electron beams to the desired spots of the display screen.

As the CRT phosphors respond to the varying intensities of the beam currents, the brightness of the picture becomes a function of the beam currents. However, over the lifetime of the cathodes, the respective beam currents do not stay constant. As a result, the picture intensity will generally change over time, notwithstanding the consistency of the voltages applied to the cathodes. Various compensation systems and techniques have been used and proposed to compensate for changes in beam currents. For example, one such system and method is described in U.S. Pat. No. 6,771,023, the disclosure of which is incorporated herein by reference.

SUMMARY OF THE INVENTION

In accordance with the presently claimed invention, a bias control circuitry and method are provided for use in controlling one or more cathode ray tube (CRT) beam currents.

In accordance with one embodiment of the presently claimed invention, bias control circuitry suitable for use in controlling one or more cathode ray tube (CRT) beam currents includes bias circuitry, video signal processing circuitry and control circuitry. The bias circuitry is responsive to one or more bias control signals and one or more processed incoming video signals by providing one or more corresponding processed video signals, one or more bias signals for controlling one or more CRT beam currents, and one or more sense signals indicative of the one or more CRT beam currents. The video signal processing circuitry is coupled to the bias circuitry and responsive to one or more incoming video signals and at least a first timing signal by providing the one or more processed incoming video signals, wherein each one of the one or more processed incoming video signals includes a video signal with a vertical blanking interval during which are provided a vertical blanking signal pulse, a sub-black signal pulse and a bias signal pulse. The control circuitry is coupled to the video signal processing circuitry and the bias circuitry, and responsive to the one or more sense signals by providing the one or more bias control signals with each one having a value related to a difference between first and second values of one of the one or more sense signals during at least respective portions of the sub-black and bias signal pulses, respectively.

In accordance with another embodiment of the presently claimed invention, bias control circuitry suitable for use in controlling one or more CRT beam currents includes biasing means, video signal processing means and controller means. The biasing means is for receiving one or more bias control signals and one or more processed incoming video signals and in response thereto conveying one or more corresponding processed video signals, generating one or more bias signals for controlling one or more CRT beam currents, and generating one or more sense signals indicative of the one or more CRT beam currents. The video signal processing means is for receiving one or more incoming video signals and at least a first timing signal and in response thereto generating the one or more processed incoming video signals, wherein each one of the one or more processed incoming video signals includes a video signal with a vertical blanking interval during which are provided a vertical blanking signal pulse, a sub-black signal pulse and a bias signal pulse. The controller means is for receiving the one or more sense signals and in response thereto generating the one or more bias control signals with each one having a value related to a difference between first and second values of one of the one or more sense signals during at least respective portions of the sub-black and bias signal pulses, respectively.

In accordance with still another embodiment of the presently claimed invention, a method for controlling one or more CRT beam currents includes:

receiving one or more incoming video signals and at least a first timing signal and in response thereto generating one or more processed incoming video signals, wherein each one of the one or more processed incoming video signals includes a video signal with a vertical blanking interval during which are provided a vertical blanking signal pulse, a sub-black signal pulse and a bias signal pulse;

receiving one or more bias control signals and the one or more processed incoming video signals and in response thereto conveying one or more corresponding processed video signals, generating one or more bias signals for controlling one or more CRT beam currents, and generating one or more sense signals indicative of the one or more CRT beam currents;

receiving the one or more sense signals and in response thereto generating the one or more bias control signals with each one having a value related to a difference between first and second values of one of the one or more sense signals during at least respective portions of the sub-black and bias signal pulses, respectively.

DETAILED DESCRIPTION OF THE INVENTION

The following detailed description is of example embodiments of the presently claimed invention with references to the accompanying drawings. Such description is intended to be illustrative and not limiting with respect to the scope of the present invention. Such embodiments are described in sufficient detail to enable one of ordinary skill in the art to practice the subject invention, and it will be understood that other embodiments may be practiced with some variations without departing from the spirit or scope of the subject invention.

Throughout the present disclosure, absent a clear indication to the contrary from the context, it will be understood that individual circuit elements as described may be singular or plural in number. For example, the terms "circuit" and "circuitry" may include either a single component or a plurality of components, which are either active and/or passive and are connected or otherwise coupled together (e.g., as one or more integrated circuit chips) to provide the described function. Additionally, the term "signal" may refer to one or more currents, one or more voltages, or a data signal. Within the drawings, like or related elements will have like or related alpha, numeric or alphanumeric designators. Further, while the present invention has been discussed in the context of implementations using discrete electronic circuitry (preferably in the form of one or more integrated circuit chips), the functions of any part of such circuitry may alternatively be implemented using one or more appropriately programmed processors, depending upon the signal frequencies or data rates to be processed.

Figure 1:
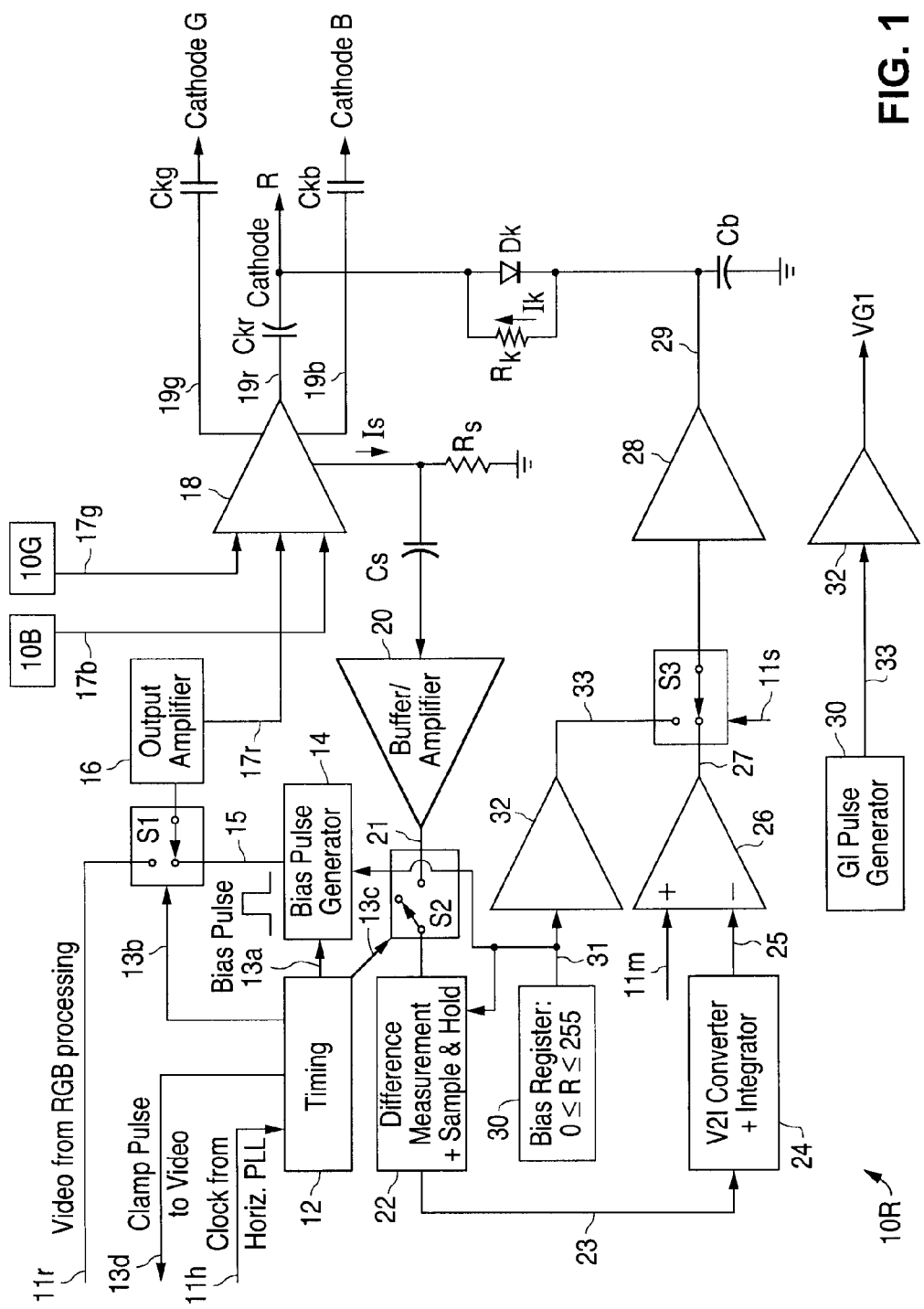
FIG. 1 is a schematic and functional block diagram of a system including bias control circuitry suitable for use in controlling one or more CRT beam currents in accordance with one embodiment of the presently claimed invention.

Referring to FIG. 1, a system including bias control circuitry suitable for use in controlling one or more CRT beam currents in accordance with one embodiment of the presently claimed invention includes three sections 10R, 10G, 10B, one for each of the primary display colors of red, green and blue. Each section 10R, 10G, 10B operates in a similar manner, so one section 10R will be discussed in detail, with the understanding that the remaining sections 10G, 10B operate in a similar manner.

As discussed in more detail below, this circuitry 10R includes three basic sections: video signal processing circuitry, bias circuitry and control circuitry. The video signal processing circuitry generally includes timing circuitry 12, bias pulse generator circuitry 14, an amplifier 16 and a switch S1 (it should be understood that this switch, as well as the additional switches discussed below, can alternatively be implemented in the form of multiplexors), all interconnected substantially as shown. The bias circuitry generally includes amplifiers 18, 28, 32, a coupling capacitor Ckr, and clamp circuitry including a diode Dk, resistor Rk and capacitor Cb, and sensing resistor Rs and coupling capacitor Cs, all interconnected substantially as shown. The control circuitry generally includes amplifiers 20, 32, switches S2, S3, measurement circuitry 22, conversion circuitry 24, bias register circuitry 30, comparison circuitry 26, and a pulse generator 30, all interconnected substantially as shown.

The timing circuitry 12 receives a timing signal, e.g., in the form of a clock signal 11$h$ from a horizontal phase lock loop circuit. Based upon this timing signal 11$h$, the timing circuitry 12 provides timing control signals 13$a$, 13$b$, 13$c$ for the bias pulse generator 14, and switches S1 and S2. The timing circuitry 12 also provides a clamping pulse signal 13$d$ for use elsewhere in the video circuitry. The bias pulse generator 14 provides a bias pulse signal 15 (discussed in more detail below) which goes to one of the throw electrodes of the switch S1. In accordance with the timing control signal 13$b$, this switch S1 selects between the bias pulse signal 15 and the incoming video signal 11$r$. The selected signal is amplified by the amplifier 16 and made available as one of the input signals 17$r$ to the three-channel amplifier 18 for driving the three cathodes via the coupling capacitors Ckr, Ckg, Ckb.

As discussed in more detail below, the cathode amplifier circuitry 18 produces a sensing current Is which flows through the sensing resistor Rs. This produces a voltage Vs across the sending resistor Rs which is AC-coupled via coupling capacitor Cs to the buffer amplifier 20. This sensing current Is, and therefore the voltage across the sensing resistor Rs, is indicative of one or more of the CRT beam currents (discussed in more detail below). The resulting buffered signal 21, in accordance with the timing control signal 13$c$, is provided to the measurement circuitry 22 via switch S2. The measurement signal 23 provided by the measurement circuitry 22 (discussed in more detail below) is converted by the conversion circuitry 24 (e.g., voltage-to-current conversion and integration). The converted signal 25 is then compared to a reference signal 11$m$ (e.g., a reference signal established by the manufacturer of the CRT) in the comparison circuitry 26. The resultant signal 27 is provided to one of the throw electrodes of switch S3. Switch S3, in accordance with a switch control signal 11$s$, selects between this comparison signal 27 and a fixed bias signal 33, with the selected signal being amplified by the amplifier 28 to provide a bias signal 29 to the clamp circuitry capacitor Cb. The fixed bias signal 33, provided via a buffer amplifier 32, originates as a bias signal 31 from the bias register circuitry 30. This bias signal 31 is also provided as a reference signal for the measurement circuitry 22 and the bias pulse generator circuitry 14.

A G1 pulse generator 30 provides a pulse signal 33 which is buffered by a buffer amplifier 32 to provide the control voltage VG1 for the control grid G1 of the CRT (not shown).

Figure 2:
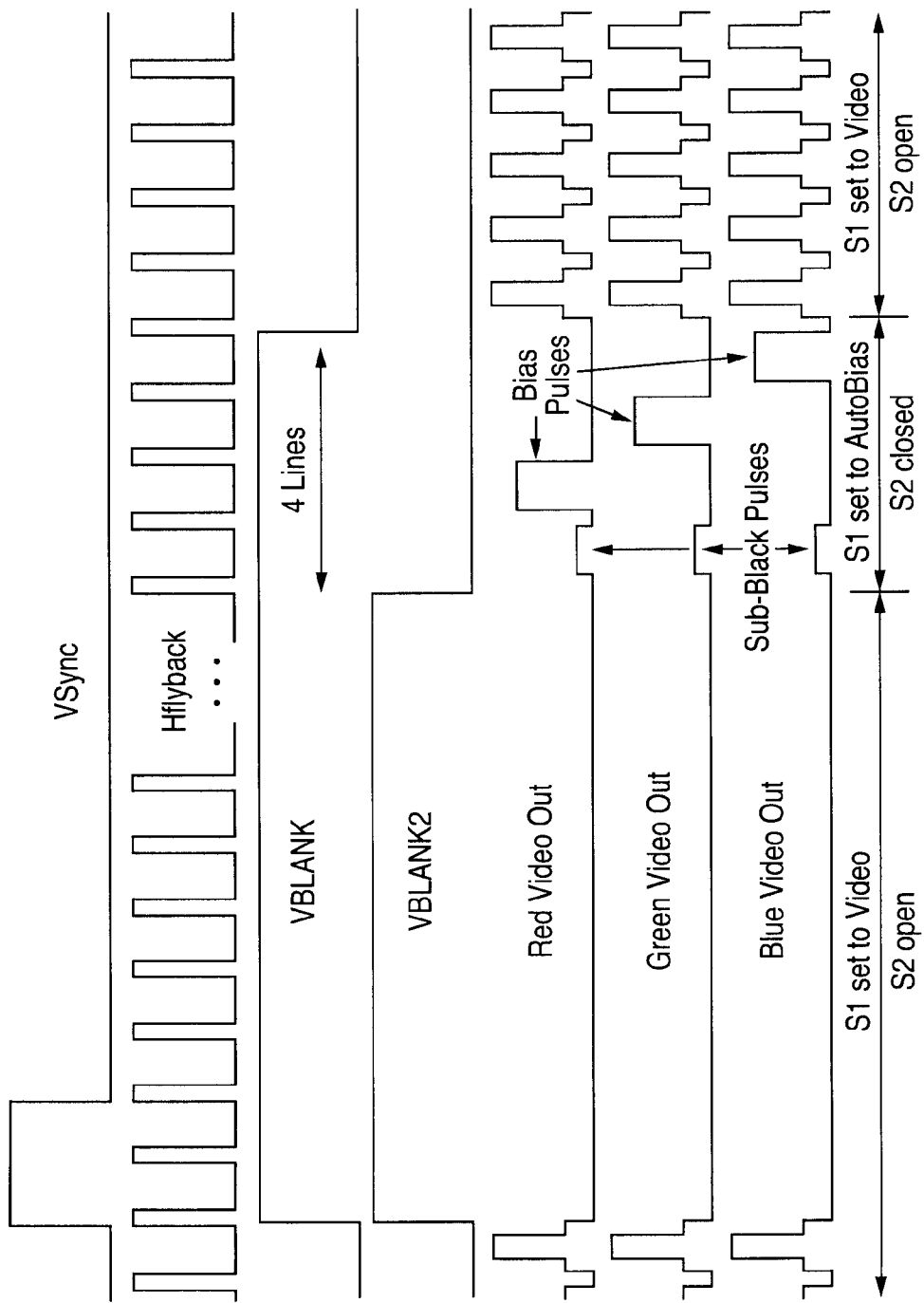
FIG. 2 is a signal timing diagram for various signals used in the circuitry of FIG. 1.

Referring to FIG. 2 in conjunction with FIG. 1, operation of this circuitry 10R can be described in more detail as follows (the vertical synchronization VSYNC and horizontal fly back HFLYBACK signals are included for reference purposes). The biasing control provided by this circuitry takes place during the vertical blanking interval VBLANK, which controls the duration of the external vertical blanking pulse and video blanking. An internal blanking pulse VBLANK2 is generated (e.g., by the bias pulse generator 14) such that its duration is 4 lines less than the vertical blanking interval VBLANK. It is this pulse VBLANK2 that initiates the sequence of sub-black pulses and three bias pulses (for the three cathodes). As shown, within each of the video signals (red, green and blue) a sub-black pulse and a bias pulse are provided.

The sub-black pulses are provided simultaneously in each of the video signals, while the bias pulses are provided individually to the video signals, one at a time. As a result, the sub-black pulse and its corresponding measurement, (discussed in more detail below) occur during the horizontal line which is fourth before the end of the vertical blanking interval. The biasing pulses are provided, one per red, green and blue channel, for each of the remaining three lines. Hence, the measurement during the sub-black signal is carried out for all CRT cathodes, while the individual bias pulses are applied sequentially to each separate cathode.

The switching intervals, as shown at the bottom of FIG. 2, are such that switch S1 is set to convey the video signal output at all times except during the AutoBias interval of four lines. Switch S2 is closed during the current measurement interval to prevent the video signals from affecting the sensing current Is and interfering with measurements.

During the first interval, switch S1 is set to the video input and switch S2 is open. The sensing current Is is measured by measuring the voltage across the sensing resistor Rs (coupled via capacitor Cs). This sensing current Is corresponds to the "dark" cathode current since all of the drivers are cut off during the vertical blanking interval and the control grid G1 is also at its blanking level. During the second interval, which switch S1 is set to AutoBias and switch S2 is closed, the video output sign 17r is set to a prescribed level, either at the sub-black level determined by the black pulse or at the bias level determined by the bias pulse, and the sensing current Is is measured with the control grid G1 still at its blanking level. The difference between these two measurements is then compared in the measurement circuitry 22 to the desired bias setting as represented by the reference signal 31 from the bias register circuitry 30. The signal 23 representing this difference is converted in the conversion circuitry 24, with the converted signal 25 now representing this difference which represents an error between the desired and actual CRT beam currents. This signal 25, following its comparison to a reference 11m determined by the CRT manufacturer, is conveyed via a switch S3 and buffered by the amplifier 28 to provide a corresponding bias control signal 29.

During these testing intervals, it is important that the CRT beam current be substantially zero so that only the baseline currents are measured. This can be ensured by applying the negative vertical blanking pulse to the control grid G1 and a small "blacker than black" (sub-black) signal to the cathode. As shown in FIG. 2, all three cathodes are driven into the sub-black level simultaneously and the combined leakage and offset currents of all three channels, as represented by the sensing current Is, are measured simultaneously. To ensure an accurate determination of the beam current in the presence of various factors that may generate errors, the DC leakage and offset currents are effectively eliminated from the feedback measurements by AC coupling the voltage across the sensing resistor Rs generated by the sensing current Is via the coupling capacitor Cs.

Another source of error, however, is the charging currents that flow through the resistor Rk in parallel with the clamping diode Dk. This current Ik, while needed to charge the coupling capacitor Ckr at start-up and when the DC bias is changed, is comparable to the beam current and must be accounted for during measurement of the sensing current Is.

As discussed above, following the baseline current measurement, i.e., with the applications of the sub-black pulses, a measurement is done of the bias-level beam currents for each cathode driver in sequence on consecutive lines, thus taking three lines to complete these measurements. The bias level beam current is applied during the vertical blanking interval, so the control grid G1 voltage VG1 is still being driven negative with respect to normal CRT operation. The cathode corresponding to the current being measured is driven with a pulse that is equal in amplitude to the negative control grid blanking pulse plus the low level reference pulse. The beam current is dependent upon the differential voltage between the control grid G1 and the cathode. In accordance with a preferred embodiment, the bias level drive is set to create a differential drive of 30 volts on the measured cathode, with the reference current level being set to be equal to this nominal beam current level for a nominal CRT.

As noted above, the current Ik through the clamp circuit resistor Rk must be accounted for when measuring the voltage across the sensory resistor Rs. This can be done by taking into account the known value of the voltage level of the input signal 17r of the output amplifier 18, the known value of the voltage gain of the amplifier 18, and the value of the resistor Rk. When accounting for this current for measuring the sense current Is during the sub-blank pulses, the effects for all three channel signals 17r, 17g, 17b must be accounted for since the sense current Is during the sub-black pulses is cumulative for all three channels.

Various other modifications and alternations in the structure and method of operation of this invention will be apparent to those skilled in the art without departing from the scope and the spirit of the invention. Although the invention has been described in connection with specific preferred embodiments, it should be understood that the invention as claimed should not be unduly limited to such specific embodiments. It is intended that the following claims define the scope of the present invention and that structures and methods within the scope of these claims and their equivalents be covered thereby.

What is claimed is:

1. An apparatus including bias control circuitry suitable for use in controlling one or more cathode ray tube (CRT) beam currents, comprising:

bias circuitry responsive to one or more bias control signals and one or more processed incoming video signals by providing one or more corresponding processed video signals, one or more bias signals for controlling one or more CRT beam currents, and one or more sense signals indicative of said one or more CRT beam currents;

video signal processing circuitry coupled to said bias circuitry and responsive to one or more incoming video signals and at least a first timing signal by providing said one or more processed incoming video signals, wherein each one of said one or more processed incoming video signals includes a video signal with a vertical blanking interval during which are provided a vertical blanking signal pulse, a sub-black signal pulse and a bias signal pulse; and control circuitry coupled to said video signal processing circuitry and said bias circuitry, and responsive to said one or more sense signals by providing said one or more bias control signals with each one having a value related to a difference between first and second values of one of said one or more sense signals during at least respective portions of said sub-black and bias signal pulses, respectively.

2. The apparatus of claim 1, wherein said video signal processing circuitry is AC-coupled to said bias circuitry.

3. The apparatus of claim 1, wherein said bias circuitry comprises:

one or more cathode electrodes to convey said one or more corresponding processed video signals;

amplifier circuitry coupled to said one or more cathode electrodes and responsive to said one or more processed incoming video signals by providing said one or more corresponding processed video signals and said one or more sense signals; and clamp circuitry coupled to said one or more cathode electrodes and responsive to said one or more bias control signals by providing said one or more bias signals.

4. The apparatus of claim 1, wherein said video signal processing circuitry comprises:

timing circuitry responsive to said at least a first timing signal by providing at least a second timing signal and at least a third timing signal;

signal generator circuitry coupled to said timing circuitry and responsive to said at least a second timing signal by providing at least said sub-black and bias signal pulses; and signal selection circuitry coupled to said timing circuitry and said signal generator circuitry, and responsive to said at least a third timing signal by sequentially selecting among said one or more incoming video signals, said sub-black signal pulse and said bias signal pulse to provide said one or more processed video signals.

5. The apparatus of claim 4, wherein said signal selection circuitry comprises a switch circuit.

6. The apparatus of claim 1, wherein said control circuitry comprises:
   signal measurement circuitry responsive to at least a fourth timing signal by measuring said one or more sense signals during said respective portions of said sub-black and bias signal pulses to provide at least first and second measurement signals; and
   processing circuitry coupled to said signal measurement circuitry and responsive to said at least first and second measurement signals by providing said one or more bias control signals.

7. The apparatus of claim 6, wherein said signal measurement circuitry comprises sample and hold circuitry.

8. An apparatus including bias control circuitry suitable for use in controlling one or more cathode ray tube (CRT) beam currents, comprising:
   biasing means for receiving one or more bias control signals and one or more processed incoming video signals and in response thereto conveying one or more corresponding processed video signals, generating one or more bias signals for controlling one or more CRT beam currents, and generating one or more sense signals indicative of said one or more CRT beam currents;
   video signal processing means for receiving one or more incoming video signals and at least a first timing signal and in response thereto generating said one or more processed incoming video signals, wherein each one of said one or more processed incoming video signals includes a video signal with a vertical blanking interval during which are provided a vertical blanking signal pulse, a sub-black signal pulse and a bias signal pulse; and
   controller means for receiving said one or more sense signals and in response thereto generating said one or more bias control signals with each one having a value related to a difference between first and second values of one of said one or more sense signals during at least respective portions of said sub-black and bias signal pulses, respectively.

9. A method for controlling one or more cathode ray tube (CRT) beam currents, comprising:
   receiving one or more incoming video signals and at least a first timing signal and in response thereto generating one or more processed incoming video signals, wherein each one of said one or more processed incoming video signals includes a video signal with a vertical blanking interval during which are provided a vertical blanking signal pulse, a sub-black signal pulse and a bias signal pulse;
   receiving one or more bias control signals and said one or more processed incoming video signals and in response thereto conveying one or more corresponding processed video signals, generating one or more bias signals for controlling one or more CRT beam currents, and generating one or more sense signals indicative of said one or more CRT beam currents;
   receiving said one or more sense signals and in response thereto generating said one or more bias control signals with each one having a value related to a difference between first and second values of one of said one or more sense signals during at least respective portions of said sub-black and bias signal pulses, respectively.

10. The method of claim 9, wherein said generating one or more bias signals for controlling one or more CRT beam currents comprises receiving said one or more bias control signals and in response thereto generating one or more voltage clamp signals.

11. The method of claim 9, wherein said generating one or more sense signals indicative of said one or more CRT beam currents comprises generating one or more signals indicative of said one or more processed incoming video signals during said sub-black and bias signal pulses.

12. The method of claim 9, wherein said receiving one or more incoming video signals and at least a first timing signal and in response thereto generating one or more processed incoming video signals comprises:
   receiving said at least a first timing signal and in response thereto generating at least a second timing signal and at least a third timing signal;
   receiving said at least a second timing signal and in response thereto generating at least said sub-black and bias signal pulses; and
   receiving said at least a third timing signal and in response thereto sequentially selecting among said one or more incoming video signals, said sub-black signal pulse and said bias signal pulse to provide said one or more processed video signals.

13. The method of claim 12, wherein said receiving said at least a third timing signal and in response thereto sequentially selecting among said one or more incoming video signals, said sub-black signal pulse and said bias signal pulse to provide said one or more processed video signals comprises switching among said one or more incoming video signals, said sub-black signal pulse and said bias signal pulse.

14. The method of claim 9, wherein said receiving said one or more sense signals and in response thereto generating said one or more bias control signals comprises:
   receiving at least a fourth timing signal and in response thereto measuring said one or more sense signals during said respective portions of said sub-black and bias signal pulses to generate at least first and second measurement signals; and
   receiving said at least first and second measurement signals and in response thereto generating said one or more bias control signals.

15. The method of claim 14, wherein said receiving at least a fourth timing signal and in response thereto measuring said one or more sense signals during said respective portions of said sub-black and bias signal pulses to generate at least first and second measurement signals comprises sampling and holding said one or more sense signals during said respective portions of said sub-black and bias signal pulses.

* * * * *

UNITED STATES PATENT AND TRADEMARK OFFICE
CERTIFICATE OF CORRECTION

PATENT NO. : 7,286,175 B1 Page 1 of 1
APPLICATION NO. : 11/160380
DATED : October 23, 2007
INVENTOR(S) : Guan It is certified that error appears in the above-identified patent and that said Letters Patent is hereby corrected as shown below:

On the cover page,

[*] Notice: Subject to any disclaimer, the term of this patent is extended or adjusted under 35 USC 154(b) by 210 days Delete the phrase "by 210 days" and insert -- by 315 days --

Signed and Sealed this

Second Day of December, 2008

JON W. DUDAS
*Director of the United States Patent and Trademark Office*